UNITED STATES PATENT OFFICE 2,487,512

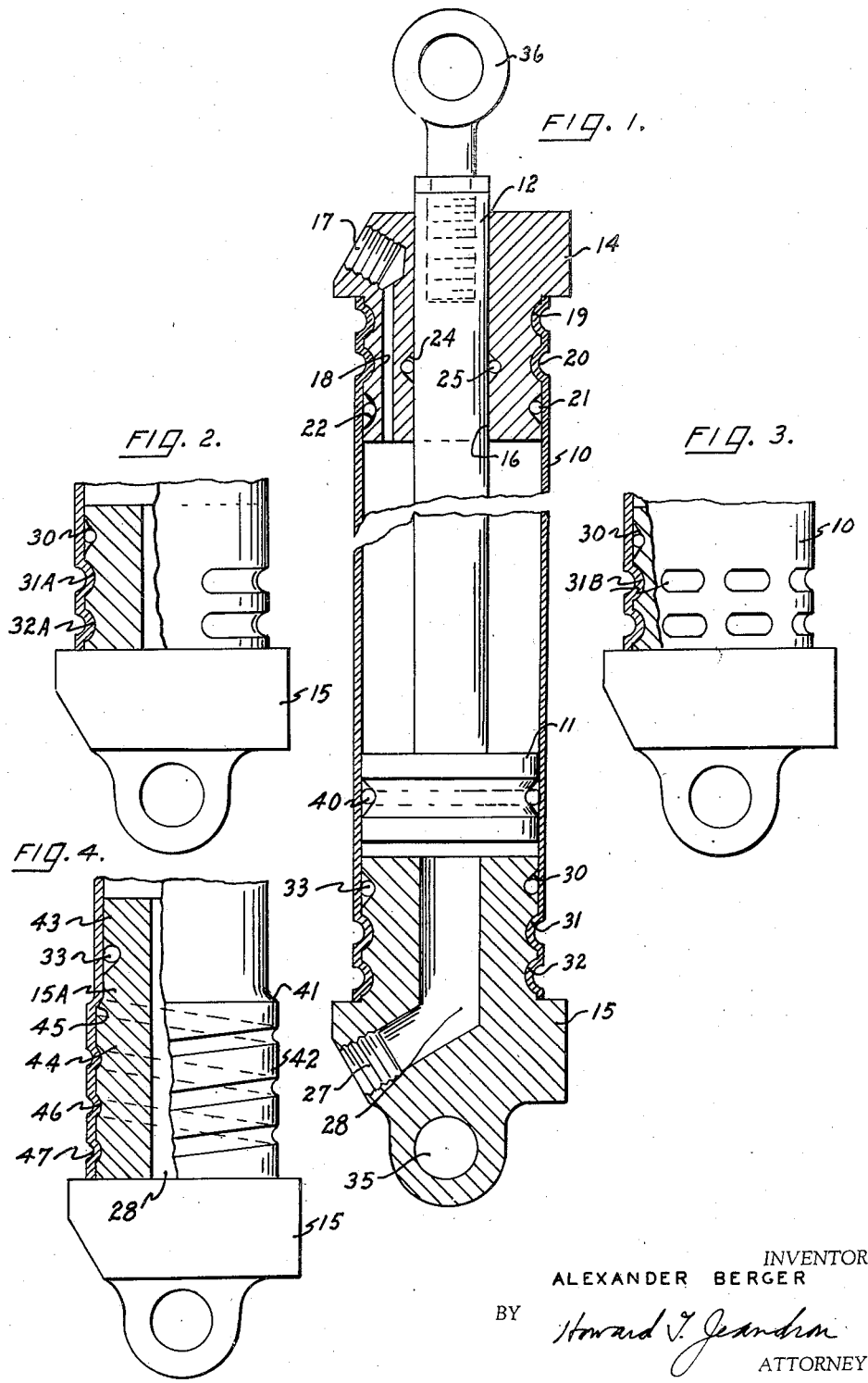

CYLINDER AND CYLINDER HEAD CONSTRUCTION

Alexander Berger, New York, N. Y., assignor to Automotive & Aircraft Hydraulics Inc., New York, N. Y.

Application January 10, 1946, Serial No. 640,213

4 Claims. (Cl. 309—2)

This invention relates to a hydraulic cylinder and more particularly to the manner of securing the opposed ends of a hydraulic cylinder.

The standard practice with hydraulic cylinders has been to prepare an internal thread or an external thread on the opposed ends of the cylinder and to threadably secure the end fittings to the opposite ends of the cylinder.

An object of this invention is to provide a hydraulic cylinder in which the end fittings are inserted within the tubular structure and the cylinder wall is swaged or spun into a circular groove in the end fitting.

A further object of this invention is to provide a tubular structure with a reciprocating piston mounted therein having two end fittings affixed to the internal surface of the tube by swaging or spinning the tubular wall into a circular groove of the end fitting.

A still further object of this invention is to provide a cylinder for fluids under pressure in which the opposed ends of said cylinder are secured to the wall of said cylinder by spinning or swaging the cylinder wall into a predetermined circular groove in the end fitting to provide a means of forming said cylinder into an integral structure.

Other objects may be apparent by reference to the accompanying drawing and the detailed description in which Fig. 1 illustrates a cross sectional view of a hydraulic cylinder.

Fig. 2 illustrates another embodiment of the cylinder end fitting shown partially in cross section, Fig. 3 illustrates a further embodiment of the cylinder end fitting shown partially in cross section, and Fig. 4 illustrates a still further embodiment of the cylinder end fitting shown partially in cross section.

Referring to Fig. 1, there is illustrated a cylinder 10 with a piston 11 mounted internally with a piston rod 12 extending from one end of said cylinder. There are provided two end fittings 14 and 15. The fitting 14 is partially inserted within the cylinder 10 and provided with a bore 16 through which the piston rod 12 passes. The end fitting 14 is also provided with a fluid port 17 which is in turn connected through a passage 18 to the internal portion of the cylinder under the piston 11. The end fitting 14 is also provided with circular grooves 19, 20 and 21. A toroidal seal 22 is mounted in the groove 21 and the wall of the cylinder 10 is spun or swaged into the grooves 19 and 20. A small groove 24 is also provided in the bore 16 so that a seal 25 may be mounted therein. The end fitting 15 is provided with a port 27 which is connected to a passage 28 which connects with the top side of the piston 11. The fitting 15 is also provided with circular grooves 30, 31 and 32 around the portion of the fitting 15 that is mounted within the wall of the cylinder 10. Into the groove 31 a toroidal seal 33 is mounted, while the cylinder wall is swaged or spun into the grooves 31 and 32. The fitting 15 is provided with an aperture 35 for attachment to means not shown, while the opposed end of the cylinder has an eye fixture 36 that is threadably secured to the end of the piston rod 12, thus the hydraulic cylinder may be secured to parts not shown at 35 and at 36.

The depth of the grooves 19 and 20 of the fitting 14 and 31 and 32 of the fitting 15 are so designed that they are at least equal to the thickness of the cylinder wall, thus when the metal has been spun or swaged into the position illustrated in the figure, the sheer stress across the cylinder wall at 31 or at 20 is such that it will exceed the burst strength of the cylinder wall in actual test. The grooves 19 and 20 and 31 and 32 are duplicated at each end of the cylinder as a precautionary measure so that although the one groove may be sufficient to provide the necessary strength, in the event of a failure, the other groove will assist in providing the required strength for this type of end fitting. The seals indicated have been stated as toroidal seals, but in the case of the seals 21 and 33, since they are in a set relationship, any shape seal to fill the cavity will be sufficient, whereas, the seal 25 and the seal 40 are preferably toroidal seals because they are continually withstanding a reciprocating motion.

Referring to Fig. 2 there is illustrated one end of a cylinder illustrating another embodiment of this invention in which the cylinder end fitting 15 has grooves 31A and 32A formed around the periphery of the portion that is inserted within the walls of the cylinder 10. The grooves 31A and 32A are formed with less than 360° of the periphery of the fitting, and the wall 10 is swaged into the grooves 31A and 32A as shown in Fig. 2 to form an integral structure. A groove 30 is formed in a complete 360° circle to accommodate a seal 33 as already described in the previous form.

Referring to Fig. 3 there is illustrated one end of a cylinder showing a further embodiment of this invention in which the cylinder end fitting 15 has cavities 31B formed around the periphery of the portion that is inserted within the walls of the cylinder 10. The cavities may be formed in most any shape or formation and the wall 10 is swaged as shown in Fig. 3 to fill the cavities and form an integral structure. The groove 30 is formed as already described.

The grooves 19, 20, 31 and 32 are shown as being formed in a complete circle of 360°. However, such grooves may be formed as a partial circle of less than 360°, as illustrated in Fig. 2, or may possibly be formed as keys or detents in a swaging operation, as illustrated in Fig. 3, without departing from the spirit of this invention. Likewise, any manner of stamping or pressing keys or detents about the periphery of the opposed ends of the hydraulic cylinder to form said cylinder and end fitting as an integral structure shall be intended according to the appended claims and in such case the useful life of the cylinder shall be equal to the life of the seals. It is not the intention of this form of the invention to replace or renew any seals.

Referring to Fig. 4 there is illustrated one end of a cylinder in which a still further embodiment of this invention is shown, in which the end of the cylinder 10 is flared at 41, leaving a substantial portion 42 of larger radii than the main body of the cylinder 10. A cylinder end fitting 15A is formed to fit snugly into the cylinder end, in which a portion 43 fits the main cylinder bore and a portion 44 fits the enlarged end bore, and the two different radii are joined by a flare 45 to conform with the flare of the cylinder tubing at 41. A groove 46 is formed or cast on the external surface of the portion 44 of the end fitting 15A. This groove 46 may take the form of a helix as illustrated in Fig. 4. The end fitting 15A may be inserted in position as illustrated and the cylinder wall of the portion 42 may be spun or swaged to form a groove 47 that conforms to the groove 46 already formed in the end fitting 15A. Another form or method of forming the groove 47 is to spin this helix before inserting the end fitting 15A and having formed a mating helical groove 47 the end fitting 15A may be threadably secured by turning the fitting until the mating grooves 46, 47 have been fully secured in position. This type of fitting, of course, will have the same passage 28 for fluid with a port 27 (not shown). The fitting 15A will also be sealed with a toroidal seal 33 fitted into a groove 30. In use this type of fitting may be readily removed to repack the seals 33 or 40 within the cylinder. The device may be re-assembled and is again ready for operation.

What is claimed is:

1. In a fluid chamber including a cylinder and two cylinder heads, said cylinder heads formed to be partially inserted within said cylinder, a continuous groove formed as a helix around the periphery of the inserted portion of each said cylinder head, and a cylinder having a continuous groove formed as a helix on a portion of the periphery of each end of the cylinder to conform with and mate with the continuous helical groove formed on the partially inserted cylinder heads when they are assembled.

2. In a cylinder, a thin walled tubular cylinder member, a cylinder head having a portion inserted in said cylinder member, said cylinder head portion carrying a resilient fluid sealing member, said cylinder head portion having an annular groove formed therein, said wall member having a portion radially deformed in said groove whereby a thin walled cylinder is produced without resort to machining its external surface.

3. In a cylinder, a thin walled tubular cylinder member of relatively hard metal such as stainless steel, a cylinder head having a portion inserted in said cylinder member, said cylinder head portion carrying a resilient O-ring sealing member, said cylinder head portion having an annular groove formed therein having a tapered surface, said wall member having a portion radially deformed in said last named groove to produce a strong joint without materially reducing the thickness of the cylinder whereby a thin walled cylinder of relatively hard metal is produced without resort to machining its external surface, the resistance of the cylinder member to axial forces being unimpaired by the joint.

4. In a fluid chamber including a cylinder and two cylinder heads, said cylinder heads formed to be partially inserted within said cylinder, a continuous groove formed as a helix around the periphery of the inserted portion of each said cylinder head, a seal inserted around the periphery of the inserted portion, and a cylinder having a continuous groove formed as a helix on a portion of the periphery of each end of the cylinder to conform with and mate with the continuous helical groove formed on the partially inserted cylinder heads when they are assembled.

ALEXANDER BERGER.

REFERENCES CITED

The following references are of record in the file of this patent:

UNITED STATES PATENTS

| Number | Name | Date |
| --- | --- | --- |
| 1,719,153 | Wertz | July 2, 1929 |
| 1,875,068 | Malby | Aug. 30, 1932 |
| 2,011,304 | Sharp | Aug. 13, 1935 |
| 2,062,216 | Fink | Nov. 24, 1936 |
| 2,254,005 | Dodson | Aug. 26, 1941 |
| 2,388,300 | Wackman | Nov. 6, 1945 |

FOREIGN PATENTS

| Number | Country | Date |
| --- | --- | --- |
| 548,527 | France | 1922 |